United States Patent
Shankar et al.

(10) Patent No.: US 7,298,705 B2
(45) Date of Patent: Nov. 20, 2007

(54) FAST-PATH IMPLEMENTATION FOR A DOUBLE TAGGING LOOPBACK ENGINE

(75) Inventors: Laxman Shankar, San Jose, CA (US); Shekhar Ambe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 996 days.

(21) Appl. No.: 10/358,315

(22) Filed: Feb. 5, 2003

(65) Prior Publication Data

US 2004/0151120 A1 Aug. 5, 2004

(51) Int. Cl.
*H04L 12/56* (2006.01)
*H04L 12/26* (2006.01)

(52) U.S. Cl. .................. 370/249; 370/404
(58) Field of Classification Search .......... 370/249, 370/401, 402, 403, 404, 405
See application file for complete search history.

(56) References Cited

U.S. PATENT DOCUMENTS

| | | | |
|---|---|---|---|
| 5,828,653 A | 10/1998 | Goss | |
| 5,831,980 A | 11/1998 | Varma et al. | |
| 5,842,038 A | 11/1998 | Williams et al. | |
| 6,061,351 A | 5/2000 | Erimli et al. | |
| 6,175,902 B1 | 1/2001 | Runaldue et al. | |
| 6,545,979 B1 * | 4/2003 | Poulin | 370/241.1 |
| 6,724,728 B1 * | 4/2004 | Manchester et al. | 370/236.2 |
| 6,788,681 B1 * | 9/2004 | Hurren et al. | 370/389 |
| 6,965,572 B1 * | 11/2005 | Boodaghians | 370/249 |
| 7,061,870 B2 * | 6/2006 | Orsatti | 370/241.1 |

\* cited by examiner

*Primary Examiner*—Ricky Q. Ngo
*Assistant Examiner*—Marcus R Smith
(74) *Attorney, Agent, or Firm*—Squire, Sanders & Dempsey L.L.P.

(57) ABSTRACT

A network component for processing a packet can include a buffer configured to receive a packet, a forwarding unit configured to forward the packet received at the first buffer to a loopback port, and a transmitting unit configured to transmit the packet out of the loopback port. In addition, the network component can include a loopback unit configured to loop back the packet into the loopback port, a first identification unit configured to identify an egress port, and a second transmitting unit configured to transmit the packet looped back from the loopback port out of the egress port.

34 Claims, 8 Drawing Sheets

FAST-PATH IMPLEMENTATION FOR A DOUBLE TAGGING LOOPBACK ENGINE

BACKGROUND OF THE INVENTION

1. Field of the Invention

The present invention relates to a method of and an apparatus for processing a packet based on a double tagging loopback engine within a Virtual Private LAN Service (VPLS), a Transparent LAN Service (TLS), a Virtual Private Switched Network Service (VPSNS), or any Layer 2 Virtual Private Network (VPN). In essence, the present invention can be applied to any packet-based service provider communication network environment, such as token ring, ATM, Ethernet, Fast Ethernet, Gigabit Ethernet, 10 Gigabit Ethernet, etc. In particular, the present invention relates to a method of and an apparatus for fast-path implementation for TLS using double tagging loopback engine that can be implemented on a semiconductor substrate such as a silicon chip, or can be implemented on software, or a combination of hardware and software.

2. Description of the Related Art

As the popularity and usage of the network computers grows, an increasing amount of end-users are being interconnected via wide area networks and the Internet. In particular, business entities, such as corporations, having multiple site-offices located in different parts of the world, are increasingly relying on the Internet to communicate with each other. For instance, a corporate entity having multiple site-offices located at geographically dispersed sites may look to a fast and efficient way using the Internet to interconnect a group of private site-offices belonging to the private corporate entity together. Accordingly, there is a need to provide a fast, inexpensive and reliable system that can offer a virtual private customer-based network wherein inter-office network connections are achieved using the fast growing Internet infrastructure, especially the Internet Service Provider (ISP).

SUMMARY OF THE INVENTION

One example of the present invention can include a method for processing a packet in a communications network. The method can include the steps of receiving a packet at a network component, forwarding the packet to a loopback port at the network component, transmitting the packet out of the loopback port, looping back the packet into the loopback port, identifying an egress port at the network component, and transmitting the packet out of the egress port.

In another example, the present invention can relate to a network component for processing a packet. The network component can have a first buffer configured to receive a packet, a forwarding unit configured to forward the packet received at the first buffer to a loopback port, and a first transmitting unit configured to transmit the packet out of the loopback port. In addition, the network component can have a loopback unit configured to loop back the packet into the loopback port, a first identification unit configured to identify an egress port, and a second transmitting unit configured to transmit the packet looped back from the loopback port out of the egress port.

Furthermore, another example of the present invention can provide a system of processing a packet in a communications network. The system can include a first receiving means for receiving a packet at a network component, a forwarding means for forwarding the packet to a loopback port at the network component, a first transmitting means for transmitting the packet out of the loopback port, a loopback means for looping back the packet into the loopback port, a first identifying means for identifying an egress port at the network component, and a second transmitting means for transmitting the packet out of the egress port.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
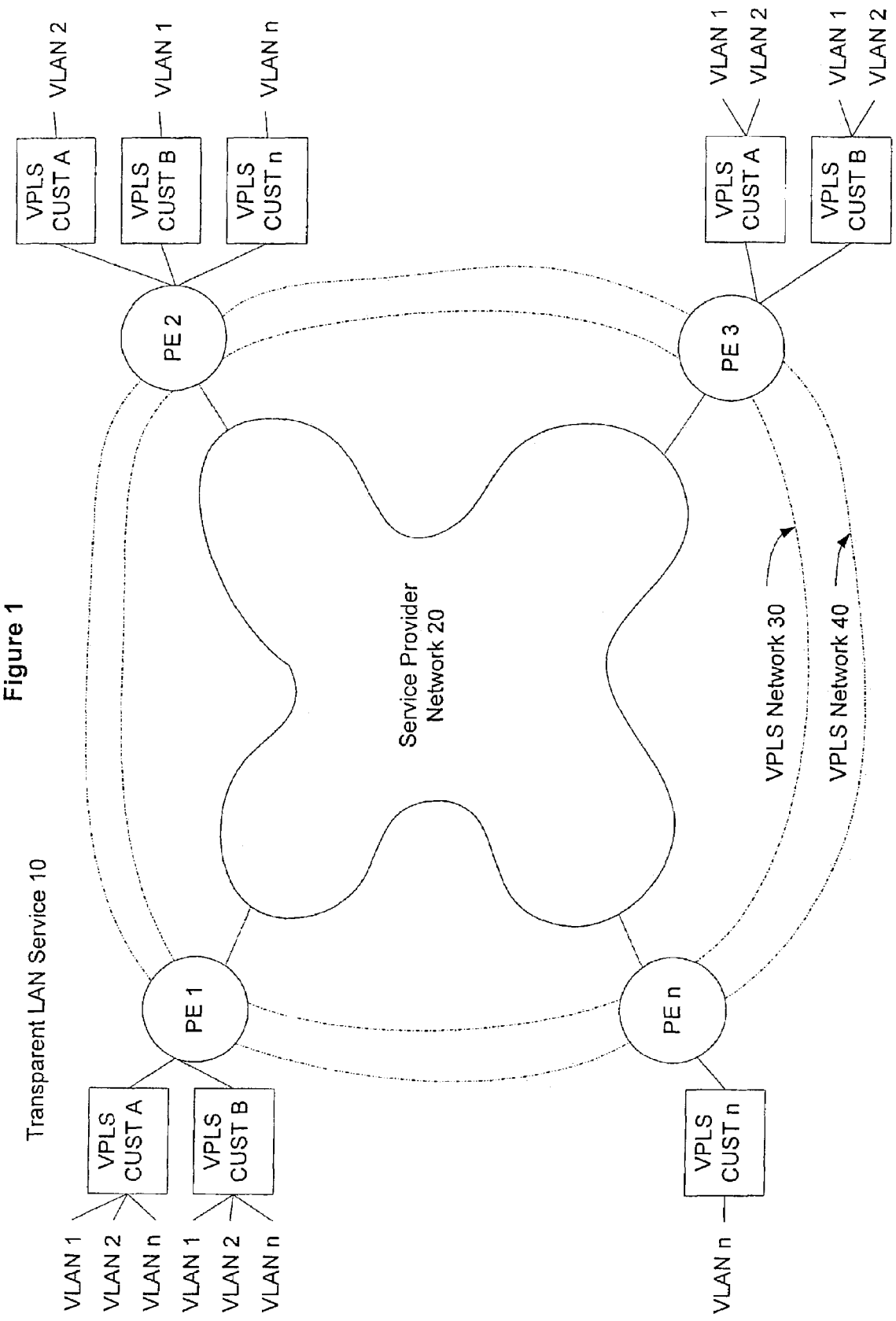
FIG. 1 illustrates one example of a Transparent LAN Service Network System in accordance with the present invention.

FIG. 1 illustrates one example of a fast-path Transparent LAN Service (hereinafter "TLS") network system 10 that can implement double tagging. The TLS network system 10 of this example can be configured to deliver Ethernet service to multiple customers geographically dispersed across a network, such as a Wide Area Network (WAN) or Meto Area Network (MAN), as if the multiple customers were connected through a Local Area Network (LAN).

The TLS network system 10 as shown in FIG. 1 illustrates a Service Provider Network (SPN) 20. The SPN 20 can be a packet switched network, such as the Internet. Also, FIG. 1 shows a plurality of Provider Edge (PE) devices PE 1, PE 2, PE 3 . . . PE n connected within the SPN 20.

In addition, FIG. 1 illustrates TLS network system 10 having two VPLS customers, VPLS CUST A and VPLS CUST B. It is noted that although FIG. 1 shows a TLS network system 10 having two VPLS customers, the present invention can be configured to handle a plurality of VPLS customers CUST n within the TLS network system 10.

Each VPLS CUST A and B can be connected to a PE device. In addition, each VPLS customer can have its own plurality of independent Virtual Local Area Networks (VLAN), VLAN 1, VLAN 2 ... VLAN n. Accordingly, FIG. 1 shows VLAN 1, VLAN 2 ... VLAN n of VPLS CUST A being "bridged" transparently over SPN 10, wherein a Service Provider VLAN, SP VLAN 30, can be configured to specifically carry all of VPLS CUST A's communication traffic. Similarly, FIG. 1 shows VLAN 1, VLAN 2 ... VLAN n of VPLS CUST B being "bridged" transparently over SPN 10, wherein SP VLAN 40 can be configured to carry all of VPLS CUST B's communication traffic.

Figure 2:
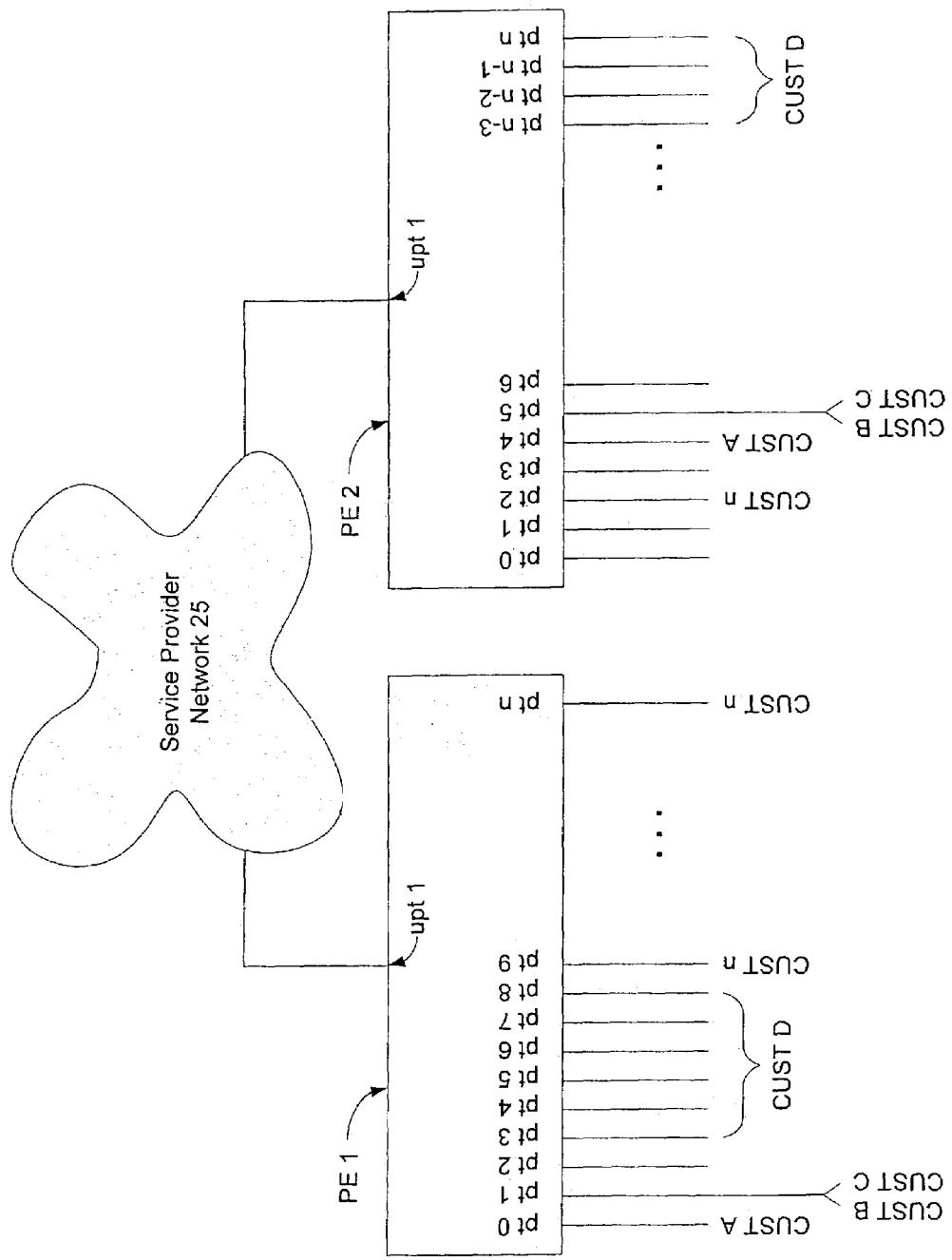
FIG. 2 illustrates another example of a Transparent LAN Service Network System in accordance with the present invention.

FIG. 2 illustrates another example of a TLS network system 15 that can include a SPN 25 and PE devices PE 1 and PE 2. Each PE device can be configured to have a plurality of ports, such as at least one uplink port, upt 1 and one or more customer facing port(s), pt 0, pt 1 ... pt n. Each port within each of the PE devices can be configured to be a receiving port, or an ingress port, as well as a transmitting port, or an egress port, for receiving and transmitting a packet, respectively. Although the TLS network system 10, 15 of the present example can manage data and/or information in the form of a packet, it is noted that in other examples of the present invention, the TLS network system 10, 15 can be configured to also manage data and/or information in other formats, such as a data frame, or a data cell. Therefore, any reference to a packet herein can also refer to at least a frame, a cell, or a data packet, a data frame or a data cell.

Further shown in FIG. 2, each port within the PE devices can be organized into groups of port(s) for one or more customer(s), wherein each organized group of port(s) can represent a VPLS domain for the TLS network system 15. According to FIG. 2, a specific customer can be provided with one or more port(s) from the PE device. As such, each port from within the organized group of port(s) assigned to the specific customer can be designated to connect with each and every VLAN of that particular customer, or selected VLANs. It is noted that one or more customer(s) can share the same organized group of port(s) from the PE device if each customer share the same set of unique VLAN IDs.

For instance, FIG. 2 shows PE devices PE 1 and PE 2 connected to a SPN 25 via an uplink port upt1, wherein PE 1 and PE 2 can be two geographically dispersed sites. PE 1 and PE 2, each has a plurality of ports pt 0, pt 1, pt 2, pt 3 ... pt n therein. Port pt 0 of PE 1 is designated for VPLS CUST A only. Port pt 1 of the same PE device however is designed for two customers, them being VPLS CUST B and C. Furthermore, ports pt 3, pt 4, pt 5, pt 6, pt 7 and pt 8, are organized as a group of ports for VPLS CUST D. As for PE 2, port pt 4 is designated for VPLS CUST A and port pt 5 is designated to both VPLS CUST B and C. Also, ports pt n-3, pt n-2, pt n-1 and pt n, are organized as a group of ports for VPLS CUST D.

Figure 3:
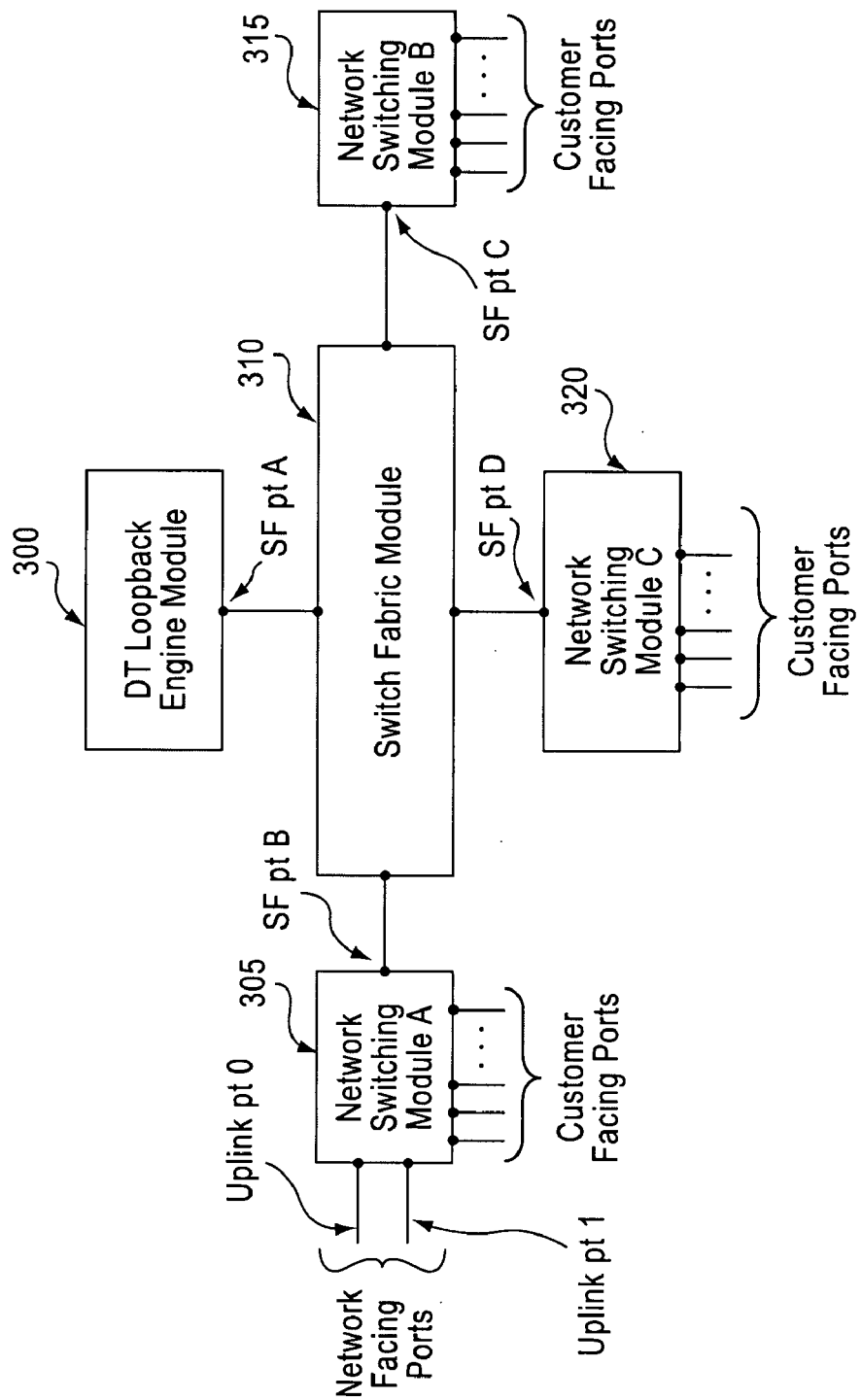
FIG. 3 illustrates one example of a Provider Edge Device in accordance with the present invention.

FIG. 3 illustrates one example of a hardware configuration of a PE device. The hardware configuration of Figure can be in an integrated, modular and single chip solution, and therefore can be embodied on a semiconductor substrate, such as silicon. Alternatively, the hardware configuration of FIG. 3 can be embodied in a plurality of discrete components on a circuit board.

FIG. 3 shows a PE device that can include a double tagging loopback engine module 300, a network switching module A 305, a switch fabric module 310, a network switching module B 315, and a network switching module C 320. The double tagging loopback engine module 300 can have one switch fabric port SF pt A that can received information from and/or transmit information to a switch fabric module 310. In addition, the double tagging loopback engine module 300 can include an ingress/egress MAC loopback port (not shown), such as a 10 gigabit Ethernet port. The ingress/egress MAC loopback port can be an external port or a port within the DT loopback engine module 300, whereby one or more packet(s) can be "transmitted" out of the egress of the DT loopback engine module through the ingress/egress MAC loopback port and can be looped back on the ingress of the same port back into the DT loopback engine module 300.

The PE device of FIG. 3 also shows network switching module A 305, network switching module B 315, and network switching module C 320. Each of the network switching modules A, B and C can be a switching chip such as the network switching chips made commercially available through the Broadcom® Corporation. Additionally, each of the network switching modules A, B and C can have one or more customer facing ports, and one switch fabric port SF pt B, C, D. The customer facing ports can connect the PE device to the customers of a SPN. The SF ports B, C and D can received information from and/or transmit information to the switch fabric module 310. The customer facing ports and the SF ports B, C and D can be an ingress port as well as an egress port. Furthermore, network switching module A can have one or more uplink ports uplink pt 0 and uplink pt 1 that can be network facing ports for receiving information from and/or transmitting information to an Ethernet, such as the Internet. It is noted that although the example provided in FIG. 3 shows network switching module A as having uplink pt 0 and uplink pt 1, network switching modules B and C can be configured to include uplink pt 0 and uplink pt 1.

The switch fabric module 310 can also be a switching chip such as the network switching chips made commercially available through the Broadcom® Corporation.

Given the configuration shown in FIG. 3, an example of a packet flow within the configuration can be as follows. A packet can be received at uplink pt 0 of network switching module A 305. The packet can be processed at network switching module A 305 and can be forwarded to the switch fabric module 310 through the switch fabric port SF pt B. The packet can be received and processed at the switch fabric module 310. Thereafter, the switch fabric module 310 can forward the packet to the DT loopback engine module 300. The packet can be received at the switch fabric port SF pt A, and can be a high gigabit port ("Higig port"). The packet is processed and is forwarded out of the ingress/egress MAC loopback port (not shown) such as a 10 gigabit port. For example, the packet can be MAC looped back into the DT loopback engine module 300. In other words, the packet does not necessarily have to physically be transmitted out of the DT looback engine module 300 for the loop back to occur. Thus, the packet can loop back from the MAC, or in the alternative can loop back externally.

Once the packet is looped back from the ingress of the 10 gigabit port, the packet can be processed based on a double tagging engine logic as explain further below. After the packet is processed, the packet is transmitted to the switch fabric module 310 and thereafter to one or more of the network switching module A, B and/or C. The packet can then be forwarded out of one or more specified customer facing ports.

Another example of a packet flow within the configuration shown in FIG. 3 can be as follows. A packet can be received at any one of the customer facing ports of the network switching modules A, B or C. Suppose for this example a packet is received at one of the customer facing ports within network switching module B. The packet can be processed at network switching module A 305 and can be forwarded to the switch fabric module 310 through the switch fabric port SF pt C. The packet can be received and processed at the switch fabric module 310. Thereafter, the switch fabric module 310 can forward the packet to the DT loopback engine module 300. The packet can be received at the switch fabric port SF pt A or the Higig port. The packet is processed and is forwarded out of the egress MAC loopback port (not shown) and can be MAC looped back into the DT loopback engine module 300.

Once the packet is looped back from the ingress of the 10 gigabit port, the packet can be processed based on a double tagging uplink logic as explain further below. After the packet is processed, the packet is transmitted to the switch fabric module 310 and thereafter to the network switching module A. The packet is then transmitted out to of either uplink pt 0 or uplink pt 1.

Figure 4:
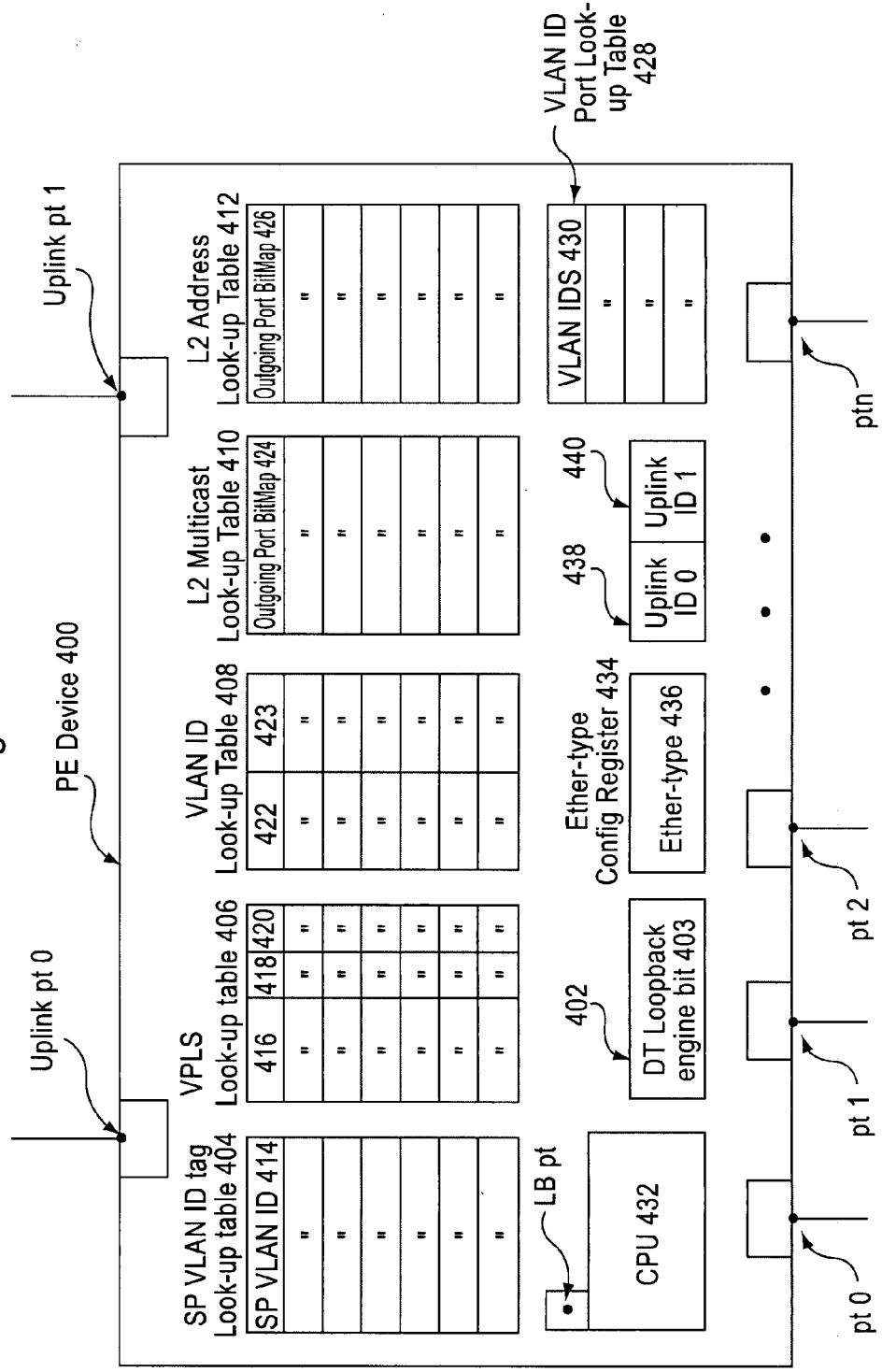
FIG. 4 illustrates another example of a Provider Edge Device in accordance with the present invention.

FIG. 4 illustrates one example of a hardware configuration of a PE device 400. The hardware configuration of FIG. 4 can be in an integrated, modular and single chip solution, and therefore can be embodied on a semiconductor substrate, such as silicon. Alternatively, the hardware configuration of FIG. 4 can be embodied in a plurality of discrete components on a circuit board.

The PE device 400 can be configured to include at least one uplink port. In this example, the PE device 400 of FIG. 4 shows two uplink ports, them being uplink pt 0 and uplink pt 1. Additionally, the PE device can have one or more customer facing port(s) or subscriber ports, pt 0, pt 1, pt 2 . . . pt n., and a MAC loopback port LB pt. As mentioned above, each port within the PE devices can be configured to be a receiving port, or an ingress port, as well as a transmitting port, or an egress port, for receiving and transmitting a packet, respectively.

The uplink ports uplink pt 0 and pt 1 can be network facing ports which can receive packets from and transmit packet to a network such as a SPN 20 of FIG. 1. In addition, the customer facing ports pt 0, pt 1, pt 2 . . . pt n can be subscriber ports wherein each customer facing port can receive packets from and transmit packet to a particular VPLS customer having one or more VLANS as show in FIG. 1. Also, the MAC loopback port LB pt can be a 10 gigabit Ethernet port. The MAC loopback port can be an external port or a port within the DT loopback engine module 300, whereby one or more packet(s) can be "transmitted" out of the egress of the DT loopback engine module through the ingress/egress MAC loopback port LB pt, and can be looped back on the ingress of the same port back into the DT loopback engine module 300.

Figure 5A:
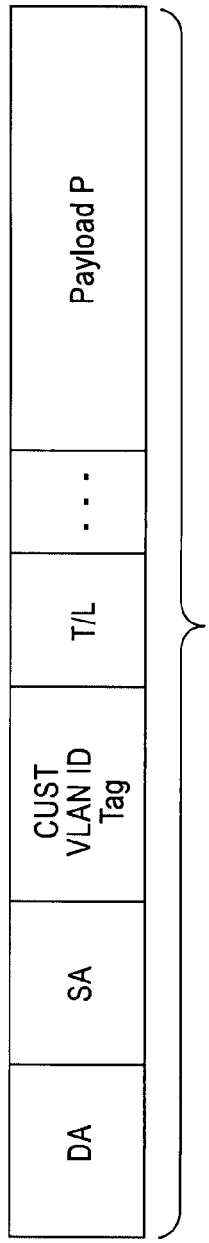
FIG. 5(a) illustrates one example of a packet inserted with a customer VLAN ID tag in accordance with the present invention.

FIG. 5(a) illustrates one example of a packet 500 that can be received in or transmitted out of any one of the customer facing ports or subscriber ports pt 0, pt 1, pt 2 . . . pt n. The packet 500 can be configured to include, at least a destination address field DA, a source address field SA, a customer VLAN identification tag VLAN ID, a type or length field T/L, and a payload P.

The destination address field can be a bit value that can be used by the receiving Media Access Controller (MAC), in order to determine if the incoming packet is addressed to the particular port. There can typically be three types of destination addresses (DA) i) unicast/individual or physical DA, ii) multicast or logical DA and iii) broadcast DA. The source address field can be a bit value and can be supplied by the transmitting MAC, which can inserts its own unique address into the source address field as the frame is transmitted, indicating it was the original station. The receiving MAC is not required to take action based on the source address field. Furthermore, the customer VLAN ID tag is a first packet tag inserted within the packet. The VLAN ID tag can identify a particular VLAN for a unique customer. In other words, if a customer has a plurality of VLANs, such as VLAN 1, VLAN 2, . . . VLANn, the customer VLAN ID tag can identify the packet as originating from one of the customer's VLANs. The T/L field can provide the type or the length of the packet. The payload P can contain the actual frame data that is being transferred.

Figure 5B:
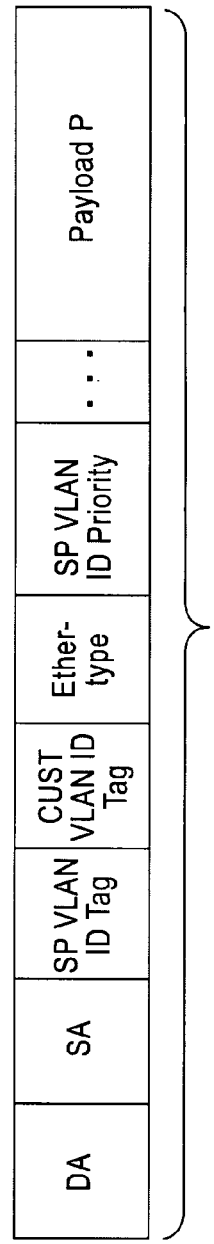
FIG. 5(b) illustrates one example of a packet inserted with a customer VLAN ID tag, an SP VLAN ID tag, and additional information in accordance with the present invention.

FIG. 5(b) illustrates one example of a packet 505 that can be received in or transmitted out of any one of an uplink pt 0 or uplink pt 1. The packet 510 can be configured to include, at least, a destination address field DA, a source address field SA, an SP VLAN ID tag, a customer VLAN identification tag VLAN ID, an Ether-type, a SP VLAN ID tag priority, an op-code and a payload P.

Packet 505 can include an SP VLAN ID tag, which can be a second tag in the packet 510. SP VLAN ID tag can specify or identify a customer within the TLS network system 10. In other words, if a TLS network system 10 includes a plurality of customers, such as VPLS CUST A, VPLS CUST B, VPLS CUST C, and VPLS CUST D, the SP VLAN ID tag can identify the packet as originating from and belonging to a particular VPLS customer.

Therefore, packet 505 can include at least a first tag, that being a customer VLAN ID tag, and a second tag, that being an SP VLAN ID tag. The SP VLAN ID tag can identify the packet as belonging to a particular VPLS customer, and the VLAN ID tag can identify the particular VLAN belonging to that VPLS customer. Accordingly, a packet having a first and second tag can always be identified as belonging to a unique VPLS customer, even if a plurality of the VPLS customer have overlapping or common VLAN IDs.

Figure 5C:
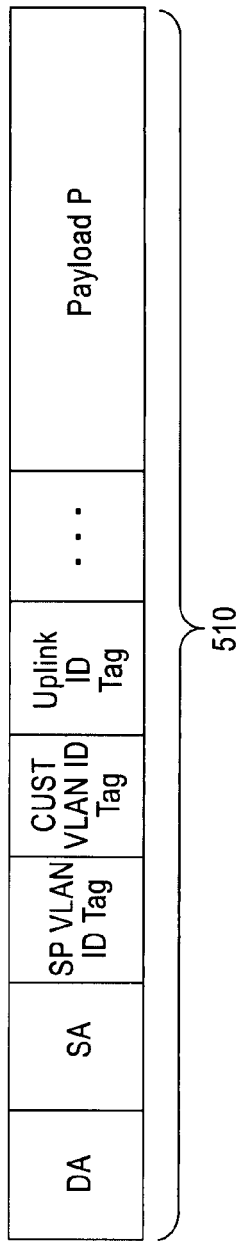
FIG. 5(c) illustrates one example of a packet inserte with a customer VLAN ID tag, an SP VLAN ID tag, a uplink ID tag, and additional information in accordance with the present invention.

In addition, FIG. 5(c) shows one example of a packet 510 that can contain a third packet tag such as an uplink VLAN tag. The third uplink VLAN tag can be appended to a packet within the PE device before the packet is looped back on the ingress of the MAC loopback port. The uplink VLAN tag can be configurable to identify the corresponding uplink port of a network switching module.

The PE device of FIG. 4 can include a storage unit 402, such as a register. The storage unit 402 can be configured to store a one-bit DT loopback engine bit 403. The DT loopback engine bit 403 can either be set or not set by various way, such as preprogramming. For example, the DT loopback engine bit 403 can have either the value of "1" which sets the DT looback engine module, or the value of "0" which un-set the DT loopback engine module. When the DT loopback engine bit 403 is set, then DT engine loopback engine module is operating under double tagging loopback mode 65.

Furthermore, the PE device of FIG. 4 can be configured to include a plurality of look-up tables, such as an SP VLAN ID tag look-up table 404, a VPLS look-up table 406, a VLAN ID look-up table 408, an L2 multicast look-up table 410, and an L2 address look-up table 412.

The SP VLAN tag look-up table 404 can include one or more SP VLAN ID tag(s) 414 and can be indexed by a source module and a source port. The SP VLAN ID tag(s) 414 within the table 404 can be obtained when a packet received at a customer facing port pt 0, pt 1, . . . pt n of the PE device 400 is to be forwarded to one of the uplink ports uplink pt 0 and uplink pt 1.

The VPLS look-up table 406 can have one or more entries. The VLPS look-up table 406 can be indexed by a SP VLAN tag that correspond to a particular customer facing port, such as pt 0, pt 1, . . . pt n. In other words, each customer facing port of the PE device 400 can have a corresponding mask entry within the VPLS look-up table 406. Thus, each mask entry can be configured to have a VPLS port bit map 416 or a membership port bit map. The VPLS port bit map 416 can be a bit string having a bit length that can be equal, for example, to a number of ports with the PE device. Each bit position of the VPLS port bit map 416 can correspond to a particular port within the PE device. In essence, the VPLS port bit map 416 can be configured to identify a group of one or more port(s) that correspond or belong to a particular VPLS membership for that PE device. In other words, the VPLS port bit map 416 can identify a group of one or more port(s) to which an unique customer's VLAN(s) can be mapped.

Accordingly, each bit position of the VPLS port bit map 416 can be set with a value or condition of either "1" or "0". By setting a bit position within the VPLS port bit map 416 with a value or condition of "1", the port corresponding to the bit position can be included as part of the group of port(s) associated with the VPLS membership. In the alternative, by setting a bit position within the VPLS port bit map 416 with a value or condition of "0", the port corresponding to the bit position can be excluded from the group of port(s) associated with the VPLS membership.

In addition, each entry within the VPLS look-up table 406 can include a Layer 2 multicast index 418 and a VPLS type 420. The Layer 2 multicast index 418 and the VPLS type 20 can correspond to a VPLS port bit map 416.

FIG. 4 also shows a VLAN ID look-up table 408 within the PE device 400. The VLAN ID look-up table 408 can include one or more preprogrammed mask entries therein. Each mask entry can be configured to have an outgoing port bit map 422 and an untagged bit map 423. The outgoing port bit map 422 can be a bit string having any bit length. Each bit position of the outgoing bit map 422 can correspond to a particular port of a particular module within the PE device 400 for a particular VLAN ID. In essence, the outgoing bit map 422 can be configured to identify one or more outgoing port(s) corresponding to a particular VLAN ID. The untagged bit map 423 can also be a bit string having any bit length. Each bit position can also correspond to a particular port of a particular module. Specifically, the untagged bit map can correspond to the uplink ports, uplink pt 0 and uplink pt 1 of the PE device 400.

Accordingly, each bit position of the outgoing bit map 422 and/or the untagged bit map 423 can be set with a value or condition of either "1" or "0". By setting a bit position within the outgoing port bit map 422 and/or the untagged bit map 423 with a value or condition of "1", the port of a specified module corresponding to the bit position can be identified or specified as an outgoing port or an outgoing port associated with a particular customer VLAN ID. In the alternative, by setting a bit position within the outgoing port bit map 422 and/or untagged bit map 423 with a value or condition of "0", the port of a specified module corresponding to the bit position can be identified or specified as not being included as an outgoing port.

The VLAN ID look-up table 408 can be indexed by the VLAN ID tag from the packet 500 of FIG. 5(a) for example. Upon receiving the packet on the ingress side of a customer facing port, the VLAN ID can be identified and indexed into the VLAN ID look-up table 408, wherein one VLAN ID mask entry having an outgoing port bit map 4422 can be identified and obtained.

FIG. 4 also shows an L2 Multicast look-up table 410 within the PE device 400. The L2 Multicast look-up table 410 can include one or more preprogrammed mask entries therein, and the size of the L2 Multicast look-up table 410 can equal to the number of multicast groups supported by the PE device 400. In addition, each mask entry within the L2 Multicast look-up table 410 can be accessed or indexed by using the customer VLAN ID and the multicast DA within the packet received. Each entry can contain a list of ports which map to a L2 multicast group.

Each mask entry within the L2 Multicast look-up table 410 can be configured to be an outgoing port bit map 424 which can be a list of ports which maps to an L2 Multicast group. The L2 Multicast look-up table 410 can be used to flood multicast packets to only those ports which have memberships of the L2 multicast group. In other words, rather than flooding a packet to the entire group of ports belonging to a particular VLAN ID, each outgoing port bit map 424 within the L2 Multicast look-up table can be used to flood a packet to only the ports having membership with the L2 multicast group.

The outgoing port bit map 424 within the L2 Multicast look-up table 410 can be a bit string having any bit length. Each bit position of the outgoing bit map 424 can correspond to a particular port within the PE device 400 having an L2 multicast membership. In essence, the outgoing port bit map 424 can be configured to identify one or more outgoing port(s) with respect to a particular L2 multicast group. Accordingly, each bit position of the outgoing port bit map 424 can be set with a value or condition of either "1" or "0". By setting a bit position within the outgoing port bit map 424 with a value or condition of "1", the port corresponding to the bit position can be identified or specified as an outgoing port associated with a particular L2 multicast membership with respect to the packet received. In the alternative, by setting a bit position within the outgoing port bit map 424 with a value or condition of "0", the port corresponding to the bit position can be identified or specified as not being included as an outgoing port of a particular L2 multicast group with respect to the packet received.

Furthermore, FIG. 4 shows an L2 Address look-up table 412 within the PE device 400. The L2 Address look-up table 412 can include one or more preprogrammed mask entries therein. In addition, each mask entry within the L2 Address look-up table 412 can be accessed or indexed by using the customer VLAN ID and the DA from the packet received.

Each mask entry within the L2 Address look-up table 424 can be configured to be an outgoing port bit map 426. The outgoing port bit map 426 within the L2 Address look-up table 424 can be a bit string having any bit length. Each bit position of the outgoing port bit map 426 can correspond to a port within the PE device 400. In essence, the outgoing port bit map 426 can be configured to identify one or more outgoing port(s) with respect to a packet received. Similar to above, each bit position of the outgoing port bit map 426 can be set with a value or condition of either "1" or "0". By setting a bit position within the outgoing port bit map 426 with a value or condition of "1", the port corresponding to the bit position can be identified or specified as an outgoing port with respect to the packet received. In the alternative, by setting a bit position within the outgoing port bit map 426 with a value or condition of "0", the port corresponding to the bit position can be identified or specified as not being included as an outgoing port with respect to the packet received.

FIG. 4 also shows a VLAN ID port look-up table 428. The VLAN ID port look-up table can include one or more entries therein. Each entry can have a VLAN ID and can be indexed or identified by source MAC address of a packet. In particular, the VLAN ID port look-up table 428 can be accessed when a packet is received within the PE device 400 whereby the packet received does not contain an Ether-type value of a predetermined value such as 08100 therein.

The PE device 400 of FIG. 4 can also include a CPU 432. The CPU 432 can be configured to implement a plurality of tasks and operations. [Laxman and Shekhar: please provide us with some examples of what sort of tasks and operations the CPU performs with respect to the present invention.]

In addition, the PE device 400 of FIG. 4 can include an Ether-type configuration register 434. The Ether-type configuration register 434 can be configured to store an Ether-type value 436 therein and can be accessed and inserted into a packet transmitted from one of the uplink ports. Also, the PE device 400 can have two registers 438 and 440 configured to store an uplink port identifier, such as uplink V0 or V1. The uplink port identifier can correspond to the uplink ports with the network switching module A of PE device 400.

Figure 6:
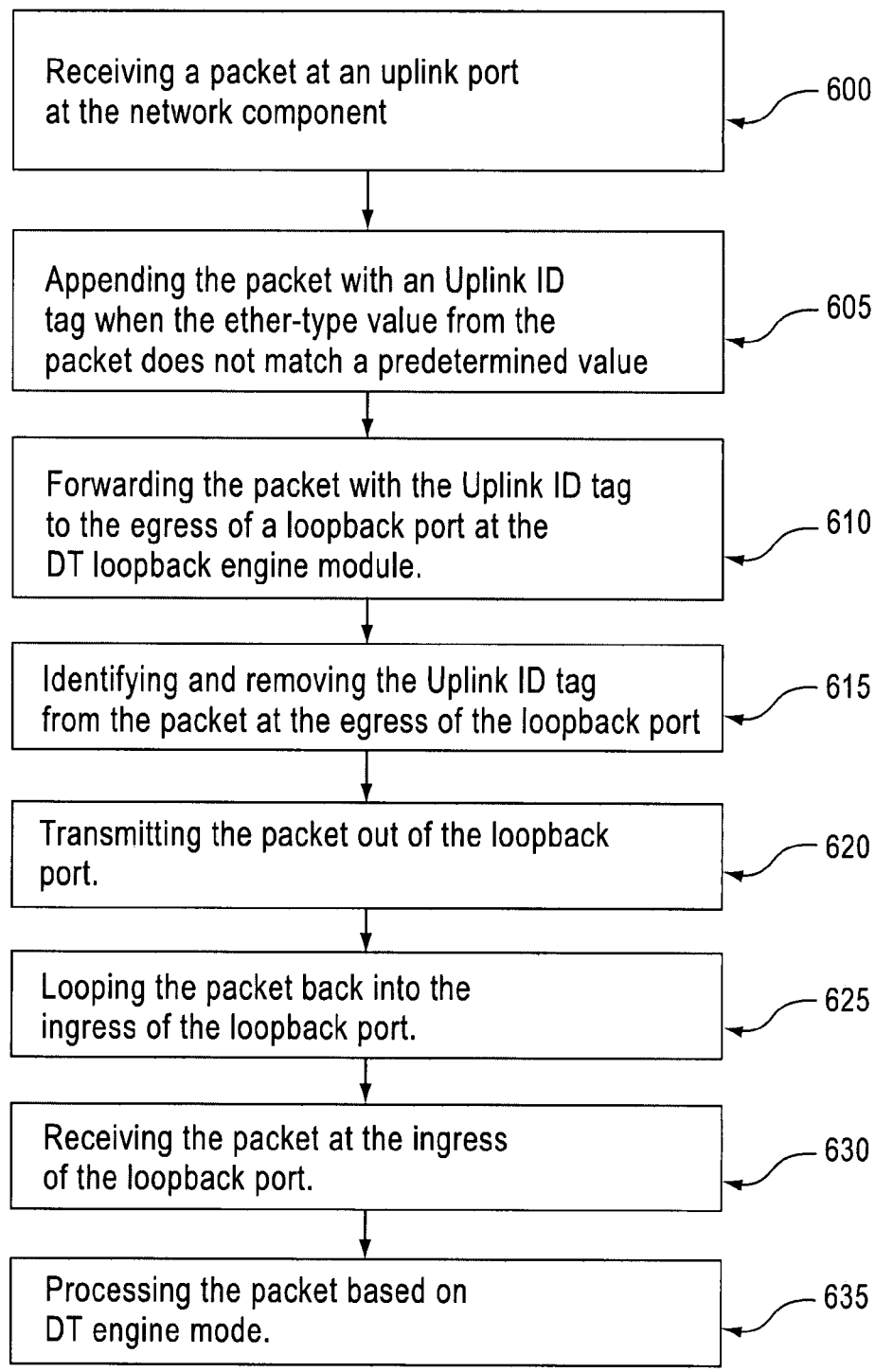
FIG. 6 illustrates one example of a method of processing a packet based on double tagging loopback engine within a TLS network system.

FIG. 6 illustrates one example of a method of processing a packet based on a double tagging loopback engine in accordance with the present invention. The method of the present example can be implemented in hardware, or software, or a combination of both hardware and software.

In particular, FIG. 6 shows one example of a method of processing a packet received on an uplink port such as uplink pt 0 or uplink pt 1 of FIG. 3 based on a double tagging loopback engine. A packet can be received at the ingress of an uplink port at step 600. The packet can be received with two tags such as an SP VLAN ID tag and an customer VLAN ID tag.

Therefore, a double tagged packet can be received at one of the uplink ports of a PE device. Once the packet is received, an ether-type value from the packet can be identified. If the ether-type value from the packet does not match a predetermined value such as 08100, then the packet is treated as "untagged" by network switching module, and therefore the packet can be appended with an uplink ID tag or VLAND ID port tag at step 605.

After the packet is appended with an uplink ID tag, the packet can have at least three tags, them being an SP VLAN ID tag, a customer VLAN ID tag, and an uplink ID tag. The packet with three tags can be forwarded to a DT loopback engine module such as the one shown in FIG. 3. The packet can be forwarded to the egress side of a loopback port at the DT loopback engine module at step 610.

Once the egress of the loopback receives the packet, the egress of the loopback port can identify the packet as originating from one of the uplink ports by identifying the uplink ID tag appended to the packet at step 615. After the egress of the loopback port determines that the packet came from one of the uplink ports, the egress removes the uplink ID tag from the packet at step 615.

Once the uplink ID tag is removed from the packet, the packet having at least the SP VLAN ID tag and the customer VLAN ID tag can be transmitted out of the loopback port at step 620, and thereafter the packet is MAC address looped back into the ingress of the loopback port at step 625. The packet is received at the ingress of the loopback port at step 630, and the packet can be processed as if it was received at an uplink port of a DT engine module. Accordingly, the ingress of the loopback port can process the packet based on a DT engine logic mode.

In other words, when a Layer 2 known unicast or a layer 2 know multicast packet is received at the uplink port based one a DT engine logic module, a destination address and a customer VLAN ID can be identified from the packet.

After identifying the destination address and the customer VLAN ID from the packet, an outgoing port bit map can be obtained from a look-up table. If the packet received is a known unicast packet, then the outgoing port bit map can be obtained from an L2 Address look-up table. However, if the packet received is a known multicast packet, then the outgoing port bit map can be obtained from an L2 Multicast look-up table.

Once the outgoing port bit map is obtained, a SP VLAN ID tag can be identified and removed form the packet. Thereafter, the packet can be forwarded to one or more destination module(s) and one or more egress port(s) based on the outgoing port bit map. The packet can be assigned a SP VLAN tag priority to the CoS, and the CoS SEL register can be modified on the subscriber egress port(s) to match the CoS of the packet.

In addition, when a Layer 2 unknown unicast, broadcast, and multicast packet is received at an ingress uplink port based on a DT engine logic module, a SP VLAN ID tag can be identified and removed from the packet.

The identified SP VLAN ID tag can be indexed to a Layer 2 multicast look-up table and obtain a L2 multicast index and a L2 multicast type from the look-up table. The packet can be appended with the L2 multicast index and the L2 multicast type. Once the packet is appended with the multicast index and the multicast type, the operation code (op-code) within the module header of the packet can be modified to "multicast" when the multicast type appended within the packet matches a first predetermined type value. Additionally, the operation code (op-code) within the module header of the packet can be modified to "IP multicast" when the multicast type appended within the packet matches a second predetermined type value.

Once the packet is appended with the multicast index and type, and the op-code within the module header of the packet is modified, a SP VLAN ID priority can be assigned to the packet's CoS. Thereafter, the packet can be forwarded to a high Gigabit ingress port of a network switching module within a PE device.

The packet can be received at the high Gigabit port of a module with a PE device. Once the packet is received, an outgoing port bit map can be obtained from indexing the L2 multicast look-up table. After the outgoing port bit map is obtained, the CoS SEL register can be modified on the subscriber egress port(s) to match the CoS of the packet, and thereafter the packet can be forwarded out of one or more subscriber customer facing port(s) based on the outgoing port bit map.

Figure 7:
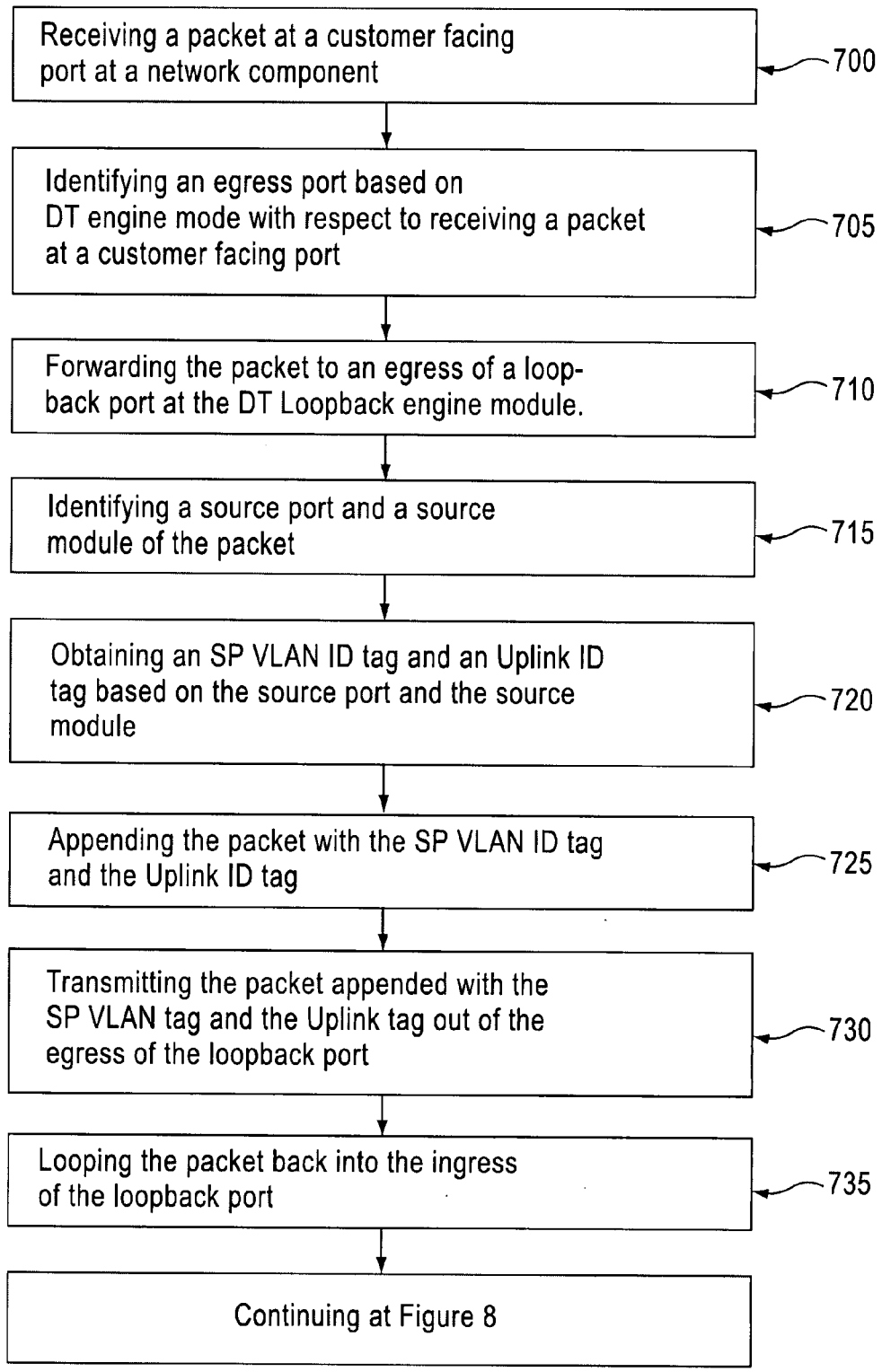
FIG. 7 illustrates another example of a method of processing a packet based on double tagging loopback engine within a TLS network system.
Figure 8:
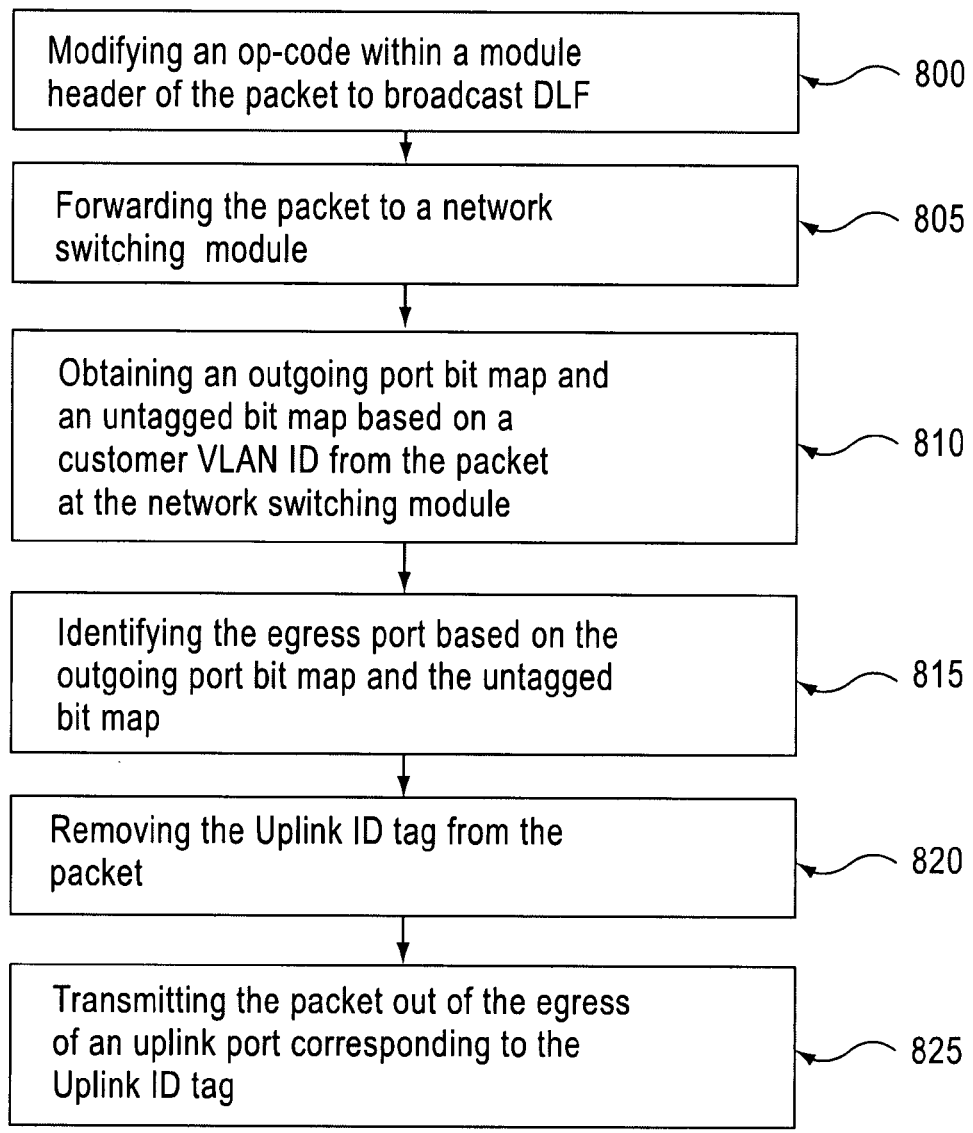
FIG. 8 illustrates another example of a method of processing a packet based on double tagging loopback engine within a TLS network system.

FIGS. 7-8 illustrate one example of a method of processing and double tagging a packet based on a double tagging loopback engine in accordance with the present invention. The method of the present example can be implemented in hardware, or software, or a combination of both hardware and software.

FIGS. 7 and 8 show one example of a method of processing a packet received at a customer facing port of a module based on a double tagging loopback engine. A packet can be received at a customer facing port such as the ones shown in FIG. 3 at step 700. Once the packet is received at the customer facing port, the present invention can identify an egress port based on DT engine logic.

According to the DT engine logic, a known Layer 2 unicast or a known Layer 2 multicast packet can be received at a customer subscriber port. A known unicast packet can be a packet that is relayed or transmitted to only one known destination port. In contrast, a known multicast packet can be a packet that is relayed or transmitted to a multiple known destination ports. Moreover, an unknown unicast/multicast/broadcast packet can be a destination-lookup-failure packet.

In other words, a received packet can be an unknown unicast/multicast/broadcast packet due to a failure in the destination address (DA) lookup for the packet received. Therefore, if the destination address lookup is not successful, then the destination port or ports with respect to the packet received is unknown.

Therefore, a known unicast or a known mulitcast packet can be received at one of the customer facing ports of a PE device based on DT engine logic. Once the packet is received, a destination address and a customer VLAN ID can be identified from the packet.

After identifying the destination address and the customer VLAN ID from the packet, an outgoing port bit map can be obtained from a look-up table. If the packet received is a known unicast packet, then the outgoing port bit map can be obtained from an L2 Address look-up table. However, if the packet received is a known multicast packet, then the outgoing port bit map can be obtained from an L2 Multicast look-up table.

Once the outgoing port bit map is obtained, a fast filtering processor can assign a class of service (CoS) to the module header of the packet based on a service level agreement (SLA). Thereafter, the packet can be forwarded to one or more destination module(s) and one or more egress port(s) based on the outgoing port bit map.

One of the egress ports can also be the loopback port. Accordingly, the packet can be forwarded to the egress of an loopback port at the DT loopback engine module at step 710. After the packet is received at the egress of the loopback port, a source module and a source port corresponding to the packet can be identified at step 715. In other words, the source module and the source port indicate the source where the packet originated.

Thereafter, the source module and the source port can be indexed to a SP VLAN tag look-up table to obtain a SP VLAN tag, and can be used to obtain a Uplink ID tag at step 720. Once the SP VLAN tag and the uplink ID tag are obtained from the SP VLAN tag look-up table and the VLAN ID port table, the packet can be appended with the SP VLAN tag and the uplink ID tag at step 725. In other words, the packet received at the egress of the loopback port of a DT loopback engine module can be appended with a SP VLAN tag and an uplink ID tag. Once the packet is appended with such information, the packet can be forwarded out of the egress of the loopback port of the DT loopback engine module at step 730.

After the packet is transmitted out of the egress, the packet can loop back into the ingress of the loopback port at step 735. Upon looping back into the ingress of the loopback port, the op-code of the module header of the packet can be modified to a "broadcast DLF" status at step 800 and can be forwarded to a network switching module at step 805.

Once the packet is received within the network switching module, a customer VLAN ID can be identified from the packet. After the customer VLAN ID tag have been identified from the packet, the VLAN ID can be indexed to a VLAN ID look-up table to obtain a corresponding outgoing port bit map and an untagged bit map at step 815. The untagged bit map can indicate which uplink port is the egress port for the packet to be transmitted out of the PE device.

After the outgoing port bit map and the untagged bit map are obtained, the egress of the identified uplink port can remove the uplink ID tag from the packet at step 820. Once the uplink ID tag is removed from the packet, the packet can be transmitted out of the egress of the uplink port that correspond to the uplink ID tag removed from the packet at step 825.

The above-disclosed system configurations of the present invention can be embodied within a Virtual Private LAN Service (VPLS), a Transparent LAN Service (TLS), a Virtual Private Switched Network Service (VPSNS), or any Layer 2 Virtual Private Network (VPN). In addition, the above-disclosed hardware configuration can be embodied in a semiconductor substrate, such as silicon. Furthermore, the methods of the invention can be implemented in hardware, or software, or a combination of both hardware and software. In addition, a person of skill in the art with respect to network system design and/or semiconductor design and manufacturing would be able to implement the various network systems, elements and methods of the present invention onto a single system or onto a single semiconductor substrate, respectively, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for processing a packet in a communications network, said method comprising the steps of:
   receiving a packet at a network component;
   forwarding the packet to a loopback port at the network component;
   transmitting the packet out of the loopback port;
   looping back the packet into the loopback port;
   identifying an egress port at the network component; and
   transmitting the packet out of the egress port,
   wherein the step of receiving the packet comprises the steps of
      receiving the packet at an uplink port; and
      appending the packet with an uplink (ID) tag when an ether-type value from the packet does not match a predetermined value.

2. The method of claim 1, further comprises the steps of:
   receiving the packet at the loopback port;
   identifying an uplink ID tag from the packet; and
   removing the uplink ID tag from the packet.

3. The method of claim 1, further comprising the steps of:
   receiving the packet at an ingress of the loopback port; and
   processing the packet based on a double tagging engine logic.

4. The method of claim 1, wherein the step of receiving the packet comprises the steps of:
   receiving the packet at a customer facing port of the network component; and
   identifying the egress port based on a double tagging engine logic.

5. The method of claim 1, further comprising the steps of:
   receiving the packet at the loopback port; and
   identifying a source address and a customer VLAN ID from the packet when the packet originated from a customer facing port.

6. The method of claim 1, further comprising the steps of:
obtaining an Service Provider (SP) VLAN ID tag from an SP VLAN ID table based on a source port and a source module of the packet;
obtaining an uplink ID tag from an uplink ID register based on the source port and the source module of the packet; and
appending the packet with SP VLAN ID tag and the uplink ID tag.

7. The method of claim 1, wherein the step of transmitting the packet out of the loopback port comprises the step of:
transmitting the packet appended with an SP VLAN ID tag and with a uplink ID tag out of the loopback port.

8. The method of claim 7, wherein the step of looping back the packet into the loopback port comprises of the step of:
looping back the packet appended with the SP VLAN ID tag and with the uplink ID tag into the loopback port.

9. The method of claim 1, further comprising the step of:
modifying an op-code within a module header of the packet to indicate a broadcast DLF status.

10. The method of claim 1, wherein the step of identifying an egress port comprises the steps of:
obtaining an outgoing port bit map and an untagged bit map based on a customer VLAN ID from the packet; and
identifying the egress port based on the outgoing port bit map and the untagged bit map.

11. The method of claim 1, wherein the step of transmitting the packet out of the egress port comprises the steps of:
removing an uplink ID tag from the packet; and
transmitting the packet out of an uplink port corresponding to the uplink ID tag.

12. A network component for processing a packet, said network component comprising:
a first buffer configured to receive a packet;
a forwarding unit configured to forward the packet received at the first buffer to a loopback port;
a first transmitting unit configured to transmit the packet out of the loopback port;
a loopback unit configured to loop back the packet into the loopback port;
a first identification unit configured to identify an egress port; and
a second transmitting unit configured to transmit the packet looped back from the loopback port out of the egress port;
an appending unit configured to append the packet received at the first buffer with an uplink (ID) tag when an ether-type value from the packet does not match a predetermined value.

13. The network component of claim 12, wherein the first buffer is configured to receive the packet from an uplink port.

14. The network component of claim 12, further comprising:
a second buffer configured to receiving the packet forwarded by the forwarding unit at the loopback port;
a second identification unit configured to identify an uplink ID tag from the packet received at the second buffer; and
a removing unit configured to remove the uplink ID tag from the packet received at the second buffer.

15. The network component of claim 12, further comprising:
a second buffer configured to receive the packet forwarded by the forwarding unit at an ingress of the loopback port; and
a processing unit configured to process the packet looped back from the loopback port based on a double tagging engine logic.

16. The network component of claim 12, wherein the first buffer is configured to receive the packet at a customer facing port, and wherein the first identification unit is configured to identify the egress port based on a double tagging engine logic.

17. The network component of claim 12, further comprising:
a second buffer configured to receive the packet at the loopback port; and
a second identification unit configured to identifying a source address and a customer VLAN ID from the packet received at the second buffer when the packet originated from a customer facing port.

18. The network component of claim 12, further comprises:
an Service Provider (SP) VLAN ID table configured to store at least one SP VLAN ID tag therein;
an uplink ID register configured to store an uplink ID tag therein;
an obtaining unit configured to obtain the SP VLAN ID tag and the uplink ID tag based on a source port and a source module; and
an appending unit configured to append the packet forwarded by the forwarding unit with the SP VLAN ID tag and the uplink ID tag.

19. The network component of claim 12, wherein the first transmitting unit is configured to transmit the packet appended with a SP VLAN ID tag and with a uplink ID tag out of the loopback port.

20. The network component of claim 19, wherein the loopback unit is configured to loop back the packet appended with the SP VLAN ID tag and with the uplink ID tag into the loopback port.

21. The network component of claim 12, further comprising:
a modifying unit configured to modifying an op-code within a module header of the packet looped back from the loopback unit to indicate a broadcast DLF status.

22. The network component of claim 12, further comprising:
an obtaining unit configured to obtain an outgoing port bit map and an untagged bit map based on a customer VLAN ID from the packet, wherein the first identifying unit is configured to identifying the egress port based on the outgoing port bit map and the untagged bit map.

23. The network component of claim 12, further comprising:
a removing unit configured to remove an uplink ID tag from the packet before transmitting the packet out by the second transmitting unit, and wherein the second transmitting unit is configured to transmit the packet out of an uplink port corresponding to the uplink ID tag.

24. A system of processing a packet in a communications network, said system comprising:
a first receiving means for receiving a packet at a network component;
a forwarding means for forwarding the packet to a loopback port at the network component;
a first transmitting means for transmitting the packet out of the loopback port;

a loopback means for looping back the packet into the loopback port;

a first identifying means for identifying an egress port at the network component; and a second transmitting means for transmitting the packet out of the egress port, wherein the first receiving means receives the packet at an uplink port and appends the packet with an uplink (ID) tag when an ether-type value from the packet does not match a predetermined value.

25. The system of claim 24, further comprising:

a second receiving means for receiving the packet at the loopback port;

a second identifying means for identifying an uplink ID tag from the packet; and a removing means for removing the uplink ID tag from the packet.

26. The system of claim 24, further comprising:

a second receiving means for receiving the packet at an ingress of the loopback port; and a processing means for processing the packet based on a double tagging engine logic.

27. The system of claim 24, wherein the first receiving means receives the packet at a customer facing port of the network component, and wherein the first identifying means identifies the egress port based on a double tagging engine logic.

28. The system of claim 24, further comprising:

a second receiving means for receiving the packet at the loopback port; and a second identifying means for identifying a source address and a customer VLAN ID from the packet when the packet originated from a customer facing port.

29. The system of claim 24, further comprising:

a first obtaining means for obtaining an Service Provider (SP) VLAN ID tag from an SP VLAN ID table based on a source port and a source module of the packet;

a second obtaining means for obtaining an uplink ID tag from an uplink ID register based on the source port and the source module of the packet; and an appending means for appending the packet with SP VLAN ID tag and the uplink ID tag.

30. The system of claim 24, wherein the first transmitting means transmits the packet appended with a SP VLAN ID tag and with a uplink ID tag out of the loopback port.

31. The system of claim 30, wherein the loopback means loops back the packet appended with the SP VLAN ID tag and with the uplink ID tag into the loopback port.

32. The system of claim 24, further comprising:

a modifying means for modifying an op-code within a module header of the packet to indicate a broadcast DLF status.

33. The system of claim 24, further comprising:

an obtaining means for obtaining an outgoing port bit map and an untagged bit map based on a customer VLAN ID from the packet, and wherein the identifying means identifies the egress port based on the outgoing port bit map and the untagged bit map.

34. The system of claim 24, further comprising:

a removing means for removing an uplink ID tag from the packet, and wherein the second transmitting means transmits the packet out of an uplink port corresponding to the uplink ID tag.

* * * * *